May 9, 1967   H. M. HOVLAND   3,318,035
COMBINATION CREEL MOUNTING CLAMP AND
FOLDABLE FISH LANDING NET
Filed Dec. 1, 1964   2 Sheets-Sheet 1
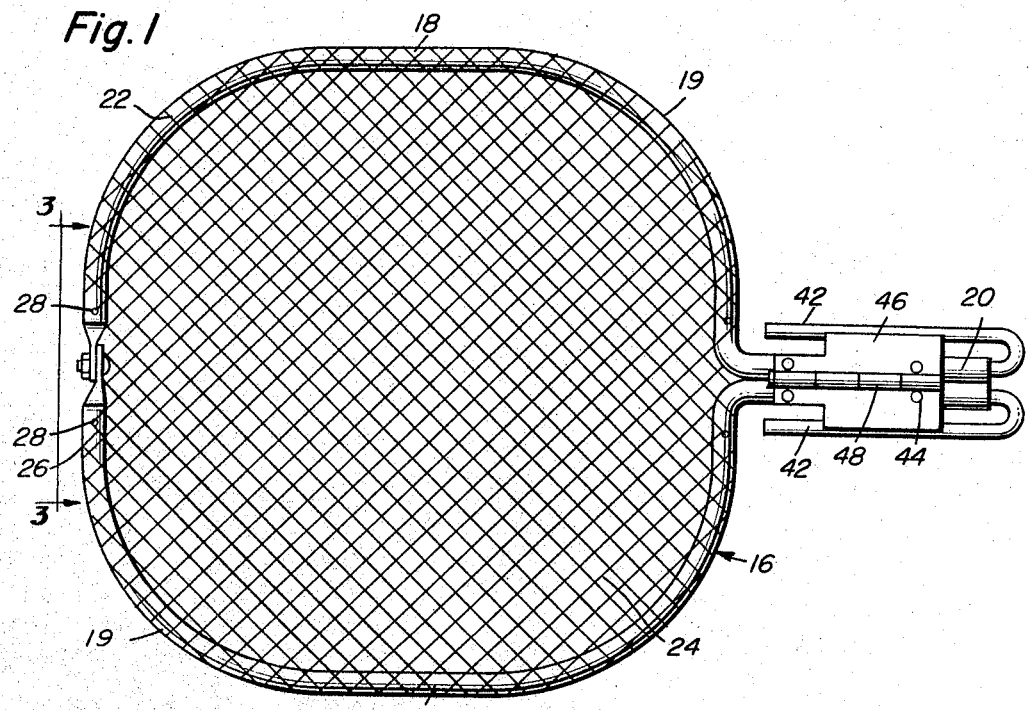
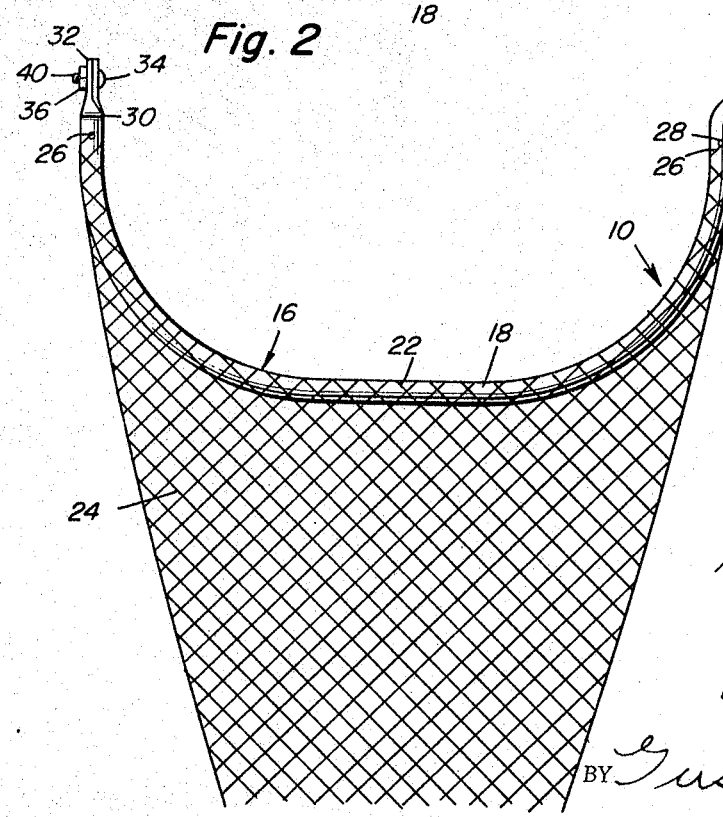
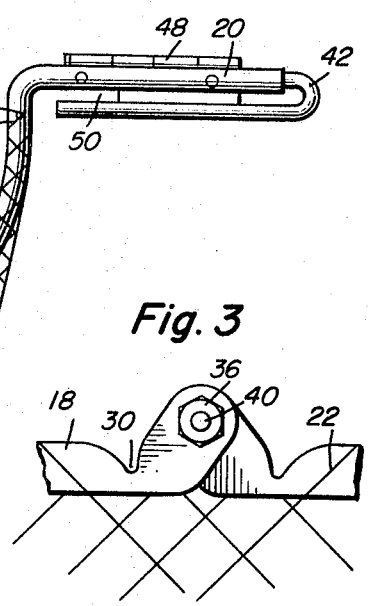
INVENTOR
Herman M. Hovland
BY *Gustave Miller*
ATTORNEY

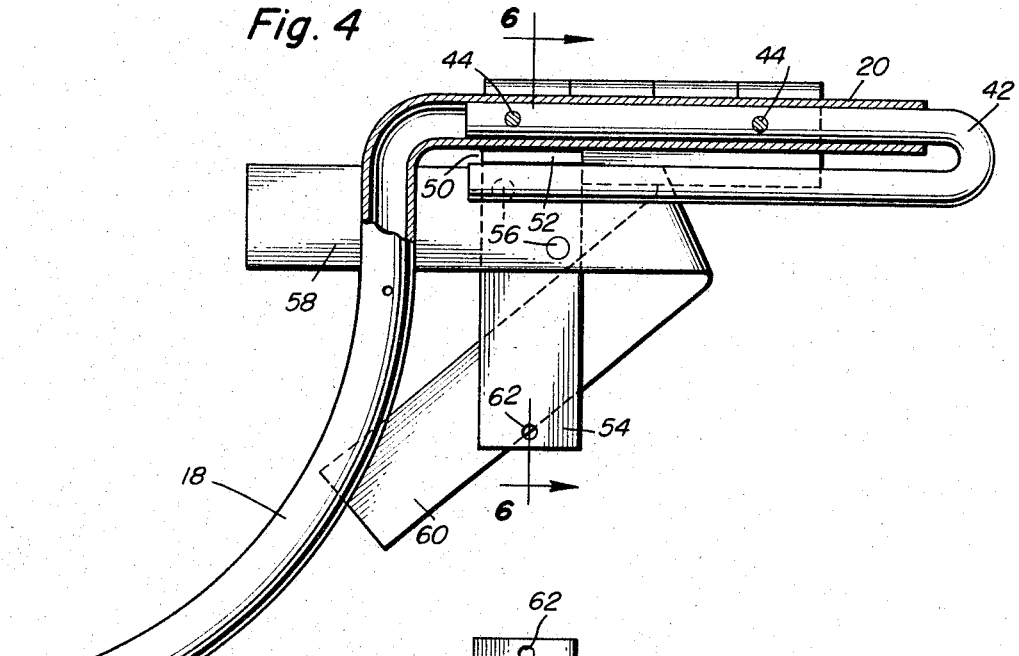
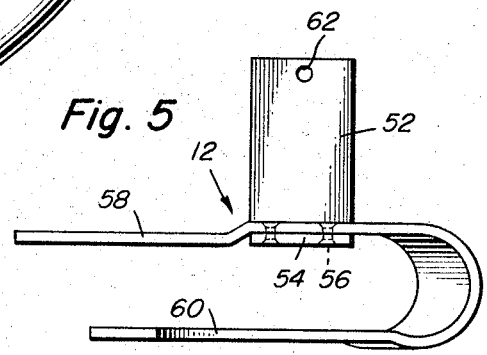
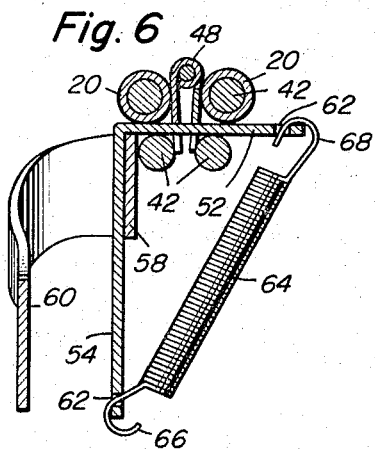
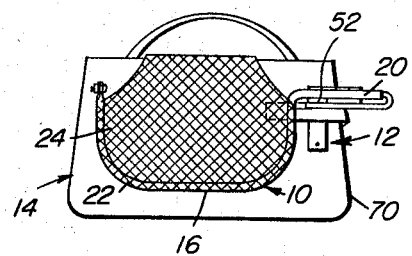

United States Patent Office 3,318,035
Patented May 9, 1967

3,318,035
COMBINATION CREEL MOUNTING CLAMP AND FOLDABLE FISH LANDING NET
Herman M. Hovland, 326 W. Winona, Duluth, Minn. 55803
Filed Dec. 1, 1964, Ser. No. 415,083
6 Claims. (Cl. 43—12)

This invention relates to a combination fish net mounting clamp and foldable fish landing net, and has for an object to eliminate the annoyance of carrying an open fish landing net through the underbrush to and along a trout stream and to provide a secure and protected means which is simple to operate both in its use and its return to carrying position and which is quickly and easily available when needed.

A further object of this invention is to provide a readily foldable and openable fish landing net and a clamp readily attachable to a portion of a fishing creel, such as the creel lid, whereby the frame of the fish landing net may be readily attached to and detached from the creel mounted clamp for transportation and for use.

A still further object of this invention is to provide a creel mountable C-clamp having a fish net frame cooperating plate thereon, and a fish net frame having a handle portion which is foldable, along with the frame, and which, when folded, provides a clamp plate receiving socket for readily mounting and dismounting the net of the creel.

A further object of this invention is to provide a combination creel mounting clamp and a fish landing net and net frame wherein the folded fish net frame may be readily detachably secured on the creel lid with the fish net protected by being draped over the creel lid and between the creel back and the back of the angler, thus protecting the net against being snagged in the underbrush through which the angler may be passing to and from the fishing area.

A further object of this invention is to provide a creel mounting clamp for the fish landing net frame which clamp may be mounted on the creel in either a left hand or right hand position, depending on the convenience of the angler.

A further object of this invention is to provide a creel mounting clamp and a fish net frame, both of which may be made of aluminum or other light weight but sufficiently strong metal, as well as of high impact plastics as are conventionally known.

With the above and related objects in view, this invention consists in the details of construction and combination of parts as will be more fully understood from the following description, when read in conjunction with the accompanying drawings, in which:

FIG. 1 is a bottom plan view of the net of this invention.

FIG. 2 is a view similar to FIG. 1 showing the net in a folded position.

FIG. 3 is a detail view of the hinge shown in FIG. 1.

FIG. 4 is an enlarged fragmentary view of the hinge and the creel mounting clamp.

FIG. 5 is an elevational view of the creel mounting clamp only.

FIG. 6 is a sectional view taken on line 6—6 of FIG. 4.

FIG. 7 is a view showing the net applied to a creel.

There is shown at 10 the foldable fish landing net and at 12 the clamp for mounting the net 10 on a fishing creel 14. The fish landing net 10 comprises a fish net frame 16 made of two substantially similar net mounting hollow metal or high impact plastic frame sections 18 having extending handle portions 20. Each net mounting frame section 18 is somewhat arc-shaped and somewhat rectangular so that the assembled sections are somewhat square, but at the corners have a three and one-quarter inch radius at 19. Both sections 18 are threaded through the supporting loops 22 of a conventional fish net 24, the ends 26 of the loops 22 being tied through apertures 28 through the frame sections 18. At the ends of the frame sections 18 opposite from the handle portions 20, the frame sections are crimped as at 30 and then flattened as at 32 and apertured to receive a securing pivot therethrough, such as a bolt 34 and nut 36, the threads being upset as at 40 to keep the nut from unthreading.

A U-shaped piece of rod 42 is inserted in the end of each hollow straight extending handle portion 20 and is maintained in the same plane as the plane of the frame section by rivets 44 extending therethrough, through the handle portions 20 and also through apertures in the leaves 46 of a hinge 48, thus securing the hinge 48 with its leaves 46 between the handle portions 20, including the U-rods 42, when in folded position, and at the bottom of the handle portions 20 when in open position.

It will be noted, particularly from FIGS. 2 and 4, as well as FIG. 7, that the hinge leaves 46 stop short of one end of the handle portions 20, and that thus, in folded position, there is a stud receiving socket 50 formed between the end edges of the folded hinge leaves 46 and the adjacent frame sections 18.

A plate 52 for entrance in the socket 50 forms one arm of an angle member whose other arm 54 is secured, as by rivets 56, to the inside of one leg 58 of a somewhat C-shaped clamp 12, the other leg 60, however, extending at somewhat an angle to the direction of the first leg 58, as apparent from FIG. 4. Apertures 62 are provided adjacent the ends of each angle arm 54 and plate 52, so that a latch member, consisting of a coil spring 64 having hooked ends 66 and 68, may be detachably hooked thereon when the plate 52 is in its socket 50 to hold the fish landing net 10 thereon.

The C-clamp legs 58 and 60 are so spaced that they may clamp over a portion of a fish creel 14, such as its lid 70, at one end or the other, depending on whether the angler is right handed or left handed. As illustrated in FIG. 7, it is clamped for a left handed angler, but by clamping it at the opposite end of the creel lid 70, it would serve a right handed angler. If desired, a mirror image clamp may be provided for the right handed angler.

In operation, the fish landing net 10 has its socket 50 mounted over the plate 52 and the net 24 is draped over the lid and between the creel 14 and the body of the angler, particularly while the angler is traveling through underbrush and along the trout stream. When fishing, it is still left in this same position, but when a fish is landed on the fishing line, the angler may, with his other hand, readily unfasten the latch by detaching the coil spring hook 68 with his free hand and then, with the same free hand, lift the socket 50 off the plate 52 and open the net to netting position.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A combination creel mounting clamp and foldable fish landing net comprising a generally C-shaped clamp for clamping attachment to a portion of a fishing creel, a plate-like fish landing net mounting means on said clamp, a foldable fish net frame, a fish net thereon, said fish net frame comprising two substantially similar sections pivotally secured together, each section comprising a somewhat curvilinear arc portion and an extending handle portion, each said handle portion being U-shaped, said U-shaped handle portion having a plane generally coinciding with the plane of its fish net frame section, a hinge secured to said U-shaped handle portions limiting the movement of said frame sections from a folded position parallel to each other to an open net position in the same plane with each other, the legs of each U-shaped handle portion being spaced apart a distance corresponding to the thickness of said plate-like mounting means, said U-shaped handle portions when in folded parallel position being in a position to cooperate with and be mounted on said mounting means on said clamp.

2. The combination of claim 1, and means securing both said handle portions on said plate-like member.

3. The combination of claim 2, said handle portions securing means comprising a detachable latch member extending between said plate-like mounting means and C-clamp.

4. The combination of claim 2, said plate-like mounting means having an angle arm at right angles thereto, said angle arm being secured to said C-clamp, said handle portions securing means comprising a latch member detachably mounted between said angle arm and said plate-like mounting means.

5. The combination of claim 4, said latch member comprising a coil spring having hooked ends for attachment through apertures in the ends of said angle arm and said plate-like mounting means.

6. A combination creel mounting clamp and collapsible fish landing net comprising a generally C-shaped clamp for clamping attachment to a portion of a fishing creel, the ends of the legs of said C-shaped clamp extending in diverging angles from each other, an angle plate secured to one leg of said clamp providing an outstanding arm apertured at its free end and another arm apertured at its free end, a coil spring detachably hooked to said apertured ends providing a latch member, a foldable fish net frame comprising a pair of similar hollow frame members pivoted together, a fish net thereon, each hollow frame member comprising an arc portion on which said fish net is mounted and a straight extending handle portion, a U-shaped rod member for each handle portion, each said U-rod member having one leg thereof secured within its handle portion with said U-rod member in substantially the same plane as said arc portion of said frame, a hinge secured to the bottom of said handle portions limiting the hinging movement of said frame sections from a folded position parallel to each other to an open net position in the same plane with each other, the leaves of said hinge being shorter than the length of said handle portions and providing a limited socket opening through said U-shaped rod members when in folded parallel position, through which limited socket opening said outstanding arm of said angle plate may extend when said latching coil spring is detached at one end to secure said fish net frame on said C-shaped clamp on the creel portion.

References Cited by the Examiner

UNITED STATES PATENTS

| | | | |
|---|---|---|---|
| 1,024,653 | 4/1912 | Sargent | 43—11 X |
| 2,246,089 | 6/1941 | Davis | 43—54.5 |
| 2,457,922 | 1/1949 | Robinson | 43—12 |
| 2,637,133 | 5/1953 | Ross | 43—12 |
| 2,795,889 | 6/1957 | Garland | 43—11 X |

SAMUEL KOREN, *Primary Examiner.*

WARNER H. CAMP, *Examiner.*